United States Patent [19]

Yip

[11] Patent Number: 5,369,499
[45] Date of Patent: Nov. 29, 1994

[54] CALIBRATION METHOD FOR VIDEO IMAGE REPRODUCTION WITH ELECTRONIC PRINTER AND VIDEO MONITOR

[75] Inventor: Kwok-leung Yip, Webster, N.Y.

[73] Assignee: Eastman Kodak Company, Rochester, N.Y.

[21] Appl. No.: 790,912

[22] Filed: Nov. 13, 1991

[51] Int. Cl.⁵ .................. H04N 1/00; H04N 1/40; H04N 5/84; H04N 5/76
[52] U.S. Cl. .................................. 358/406; 358/447; 358/335; 358/345
[58] Field of Search ............... 358/406, 444, 445, 447, 358/335, 345, 244

[56] References Cited

U.S. PATENT DOCUMENTS

| | | | |
|---|---|---|---|
| 4,586,085 | 4/1986 | Haendle | 358/244 |
| 4,709,271 | 11/1987 | Yamaguchi et al. | 358/244 |
| 4,742,397 | 5/1988 | Ferla et al. | 358/244 |
| 4,794,460 | 12/1988 | Shiota | 358/345 |
| 4,939,581 | 7/1990 | Shalit | 358/244 |
| 4,949,135 | 8/1990 | Ng | 355/327 |
| 4,962,433 | 10/1990 | Matsushima | 358/335 |
| 5,018,085 | 5/1991 | Smith . | |
| 5,036,402 | 7/1991 | Shiota | 358/244 |
| 5,053,879 | 10/1991 | Kubota | 358/244 |
| 5,184,214 | 2/1993 | Tatsumi | 358/80 |

OTHER PUBLICATIONS

C. J. Bartleson and E. J. Breneman, "Brightness Perception in Complex Fields", J. Opt. Soc. Am., vol. 57, pp. 953-957 (1967).

J. L. Mannos and D. J. Sakrison, "The Effects of a Visual Fidelity Criterion on the Encoding of Image", IEEE Trans. Inf. Theory, vol. 20, pp. 525-536 (1974).

R. P. Schwenker, "Film Selection Considerations for Computed Tomography and Ultrasound Video Photography", SPIE, vol. 173, pp. 75-80 (1979).

E. R. Ritenour, S. N. Sahu, R. P. Rossi and T. R. Nelson, "Quantitative Methods for Hard-Copy Device Adjustment", SPIE, vol. 767, pp. 529-535 (1987).

L. G. Glasser, A. H. McKinney, C. D. Reilly and P. D. Schnelle, "Cube-Root Color Coordinate System", J. Opt. Soc. Amer., vol. 48, pp. 736-740 (1958).

Primary Examiner—Edward L. Coles, Sr.
Assistant Examiner—Kimberly A. Williams
Attorney, Agent, or Firm—William F. Noval

[57] ABSTRACT

A technique for calibrating a cathode ray tube multiformat camera and a video monitor. A video image is corrected on a pixel-by-pixel basis and a gray scale is produced on a photosensitive medium, such as film, and on a monitor with uniform quantization in perceived lightness (i.e., perceived lightness or gray shade varies linearly with digital image code value). Consequently, there is no loss of small-signal and strong-signal structures (detail), and all the image information is recorded on film and clearly displayed on the monitor.

7 Claims, 4 Drawing Sheets

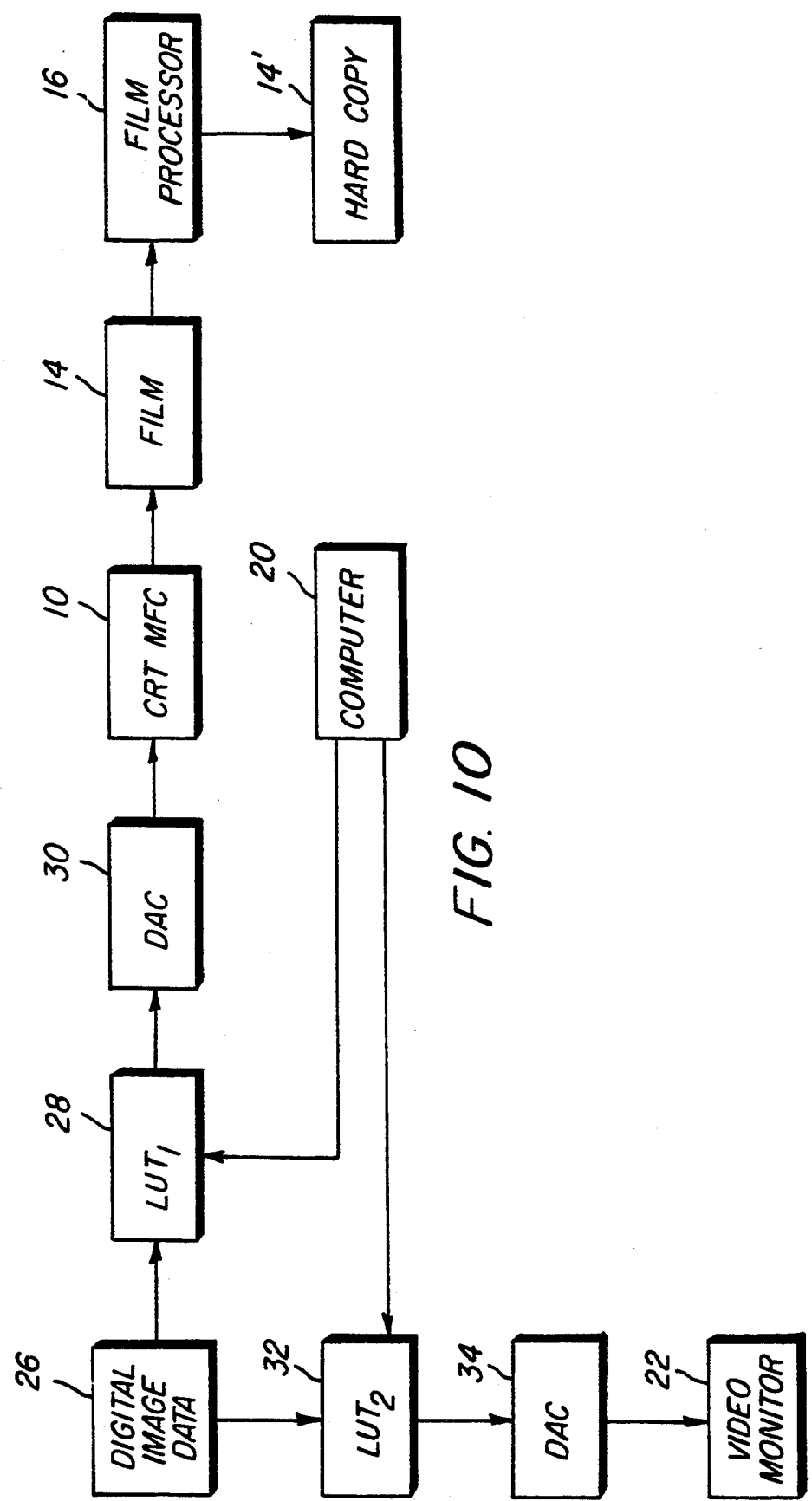

CALIBRATION METHOD FOR VIDEO IMAGE REPRODUCTION WITH ELECTRONIC PRINTER AND VIDEO MONITOR

FIELD OF THE INVENTION

The present invention relates to the calibration of a cathode ray tube (CRT) multiformat camera (MFC) and of a video monitor to provide a consistent reproduction of a video image both on film and on the monitor, using a gray scale which matches the visual perception characteristics and provides equal visualization for equal image value changes over the entire film density range.

BACKGROUND OF THE INVENTION

It is well known that the sensitivity of the human eye to small variations in shades of gray is intrinsically non-linear with respect to the optical density of film. According to the literature (see: C. J. Bartleson and E. J. Breneman, "Brightness perception in Complex Fields", J. Opt, Soc. Am., vol. 57, pp. 953–957 (1967). J. L. Mannos and D. J. Sakrison, "The Effects of a Visual Fidelity Criterion on the Encoding of Image", IEEE Trans. Inf. Theory, vol. 20, pp. 525–536 (1974).), the relationship between perceived lightness ($S_f$) and film density ($D_f$) was measured to be $$S_f = c_1(L_f)^p + c_2 \quad (1)$$
$$= c_1 (K\, 10^{-D_f})^p + c_2$$

where $c_1$ and $c_2$ are normalization constants, $L_f$ is the luminance from film, K is the view-box luminance, and p is close to $\tfrac{1}{3}$.

Conventionally, a Cathode Ray Tube Multi-Format Camera (CRT MFC) is calibrated to produce a gray scale on film which matches the gray scale of the monitor (see: R. P. Schwenker, "Film Selection Considerations for Computed Tomography and Ultrasound Video Photography", SPIE, vol. 173, pp. 75–80 (1979); E. R. Ritenour, S. N. Sahu, R. P. Rossi, and T. R. Nelson, "Quantitative Methods for Hard-Copy Device Adjustment", SPIE, vol. 767, pp. 529–535 (1987); H. Shalit, "Method and System in Video Image Hard Copy Reproduction", U.S. Pat. No. 4,939,581, Jul. 3, 1990; L. G. Glasser, A. H. McKinney, C. D. Reilly, and P. D. Schnelle, "Cube-Root Color Coordinate System", J. Opt. Soc. Amer., vol. 48, pp. 736–740, 1958.) However, there is no universal or standard gray scale for the monitor. Usually, the gray scale on the monitor is subjectively set up by the individual radiologist or technician. Therefore, the "look" of the images on film will vary and depend on the setup of the monitor.

Alternatively, a CRT MFC can be calibrated to give a gray scale on film with uniform quantization in density, i.e. the output film density varies linearly with the input code value. From Eq. (1), the perceived lightness will be a nonlinear function of digital image code value. As a result, it would be difficult to see the differences in gray shades in film at high-densities under standard view-box conditions.

The following patents also disclose various video printers, none of which provide a solution to the problem loss of low gray scale and high gray scale detail.

U.S. Pat. No. 4,742,397, issued May 3, 1988, inventors Ferla et al.;

U.S. Pat. No. 4,794,460, issued Dec. 27, 1988, inventor Shiota;

U.S. Pat. No. 4,586,085, issued Apr. 29, 1986, inventor Haendle;

U.S. Pat. No. 4,962,433, issued Oct. 3, 1990, inventor Matsushima;

U.S. Pat. No. 4,709,271, issued Nov. 24, 1987, inventors Yamaguchi et al.; and

U.S. Pat. No. 5,018,085, issued May 21, 1991, inventor Smith.

SUMMARY OF THE INVENTION

According to the present invention, the calibration of a CRT MFC and a video monitor involve the correction of a video image, on a pixel-by-pixel basis, and the production of a gray scale on a photosensitive medium, such as film, and on a monitor with uniform quantization in perceived lightness (i.e., perceived lightness (or gray shade) varies linearly with digital image code value). Consequently, there will be no loss of small-signal and strong-signal structures, and all the image information will be recorded and clearly displayed.

BRIEF DESCRIPTION OF THE DRAWINGS

FIG. 10 is a block diagram of the embodiment of FIG. 1 including LUTs determined by the present invention.

DESCRIPTION OF THE PREFERRED EMBODIMENTS

Referring now to the Figures, there will be described a preferred embodiment of the present invention. Although the invention will be described with respect to a cathode ray tube multiformat camera (CRT MFC), the invention is also applicable to other types of electronic printers, such as laser-film printers, xerographic laser printers, ink-jet printers and thermal dye transfer printers, which use various types of recording media including paper and film. The digital images to be reproduced may come from any digital image source, such as medical imaging modalities (ultrasound (US), nuclear medicine (NM), computerized tomography (CT), digital subtraction angiography (DSA), magnetic resonance imaging (MRI), computed radiography (CR), digital fluorography (DF)), x-ray film digitizers and archived digital images.

Figure 1:
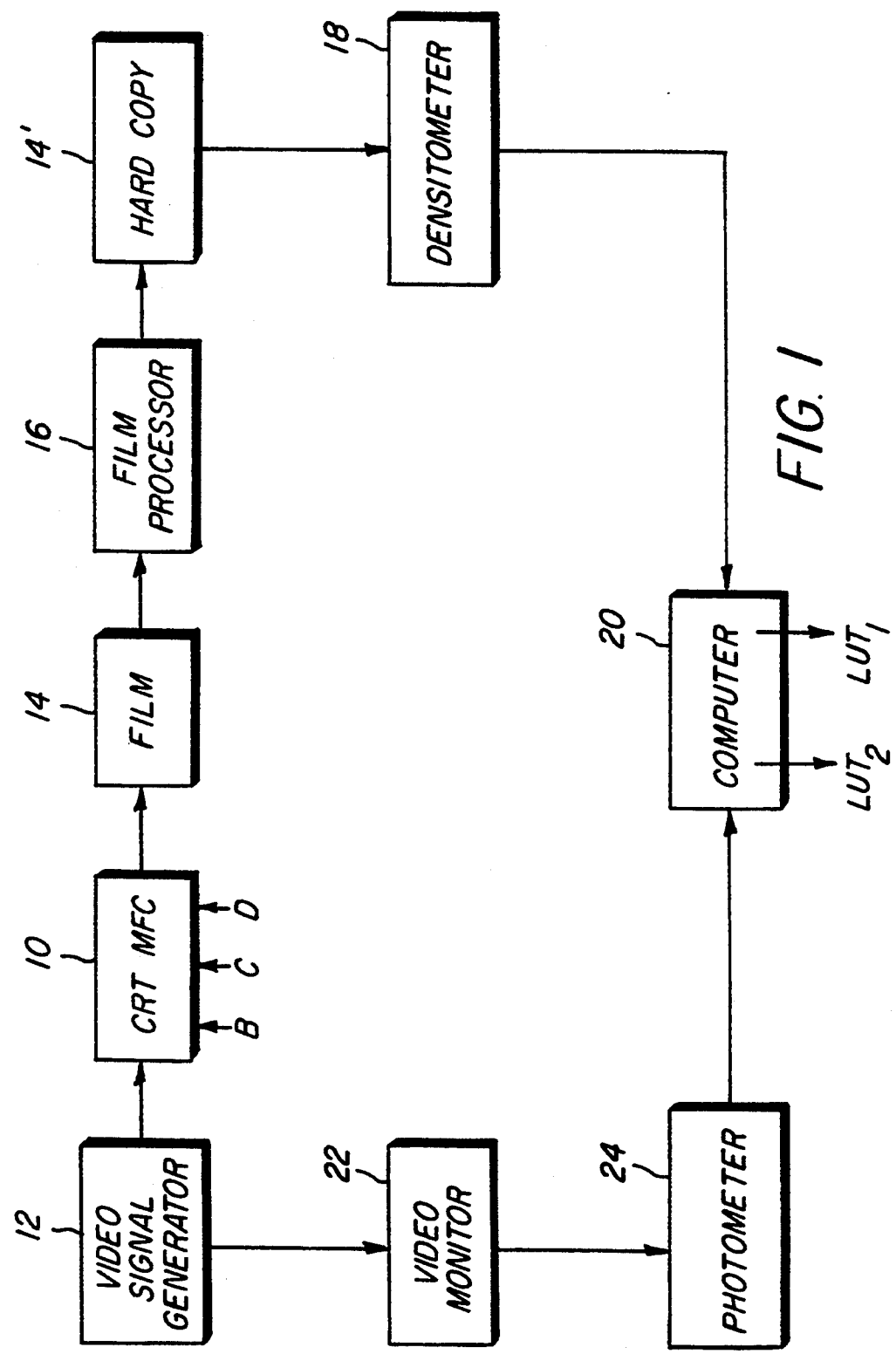
FIG. 1 is a block diagram of one embodiment of the system of the present invention.

FIG. 1 is a block diagram of an embodiment of the present invention. As shown, CRT MFC 10 and video monitor 22 are calibrated to provide equal visualization for equal image value changes over the visual range of each device. A video signal generator 12 produces a test image such as a step tablet of graduated gray scale values. The test image is applied to CRT MFC 10 and video monitor 22. The CRT MFC exposes film 14 which is developed by film processor 16 to produce hard copy (developed film) 14'. Densitometer 18 measures density values of copy 14' which are sent to computer 20 to produce a first look-up table LUT$_1$. Photometer 24 measures gray scale values on the test image displayed on monitor 22, which are sent to computer 20 to produce a second look-up table LUT$_2$.

Calibration of CRT MFC 10 and video monitor 22 is effected as follows.

At the customer site, the CRT MFC 10 is initially set up by a technical representative from the manufacturer to obtain an approximation of the desired "look" or gray scale ($D_{min}$, $D_{max}$, and density gradation) on film. This is done by printing a gray scale test pattern supplied from a video signal generator 12 and by adjusting brightness (B), contrast (C), and density (D) of the camera 10 settings. The resulting B, C, and D values ($B_0$, $C_0$, and $D_0$) are saved for later use by the calibration algorithm.

Now the camera 10 is calibrated as follows.

(1) Expose gray scale test pattern (e.g., code value (CV)=0 to 255 with increment of 17) using the above $C_0$ and $D_0$ settings with various values of B (e.g., from 20 to 80 with increment of 10). The test pattern images can be exposed on a single film 14 since camera 10 is capable of exposing plural images on film 14 (such as 4, 6 or 9 images).

(2) Process film and measure film density for the darkest level (corresponding to CV=0 for a positive image).

Figure 2:
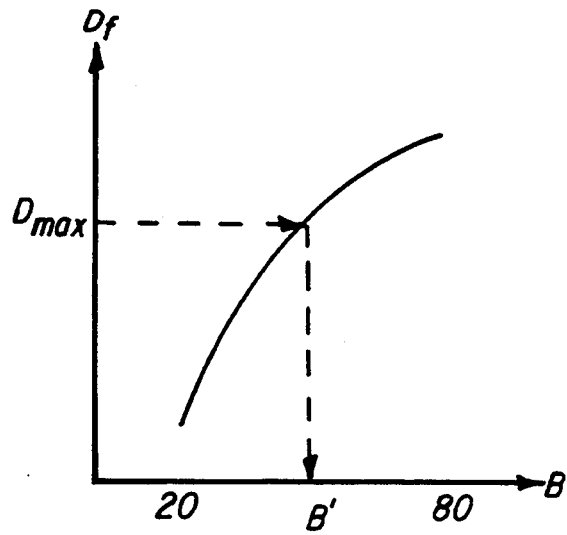
FIGS. 2–4 are graphical views useful in describing the calibration technique of the present invention in determining a look-up-table (LUT) for a video printer.

(3) Use FIG. 2 to find the new B setting (B') to give the desired $D_{max}$.

(4) Expose the same test pattern with camera 10 on new film 14.

(5) Process new film 14 in processor 16 and measure film density of new processed film 14' with densitometer 18 for each gray level. Calculate film density by computer 20 for other code values using cubic spline or other interpolation techniques.

Figure 3:
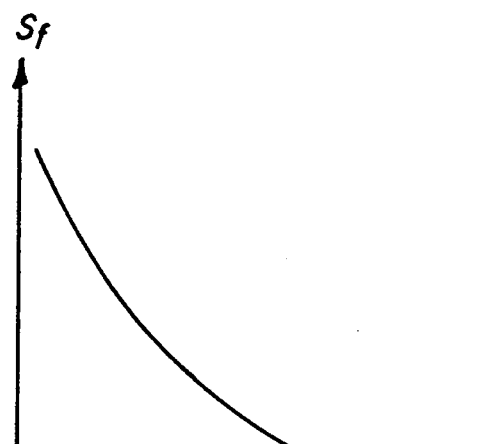

(6) Convert density values into perceived lightness values by using the visual perception characteristic curve of FIG. 3, which is calculated from Eq. (1).

Figure 4:
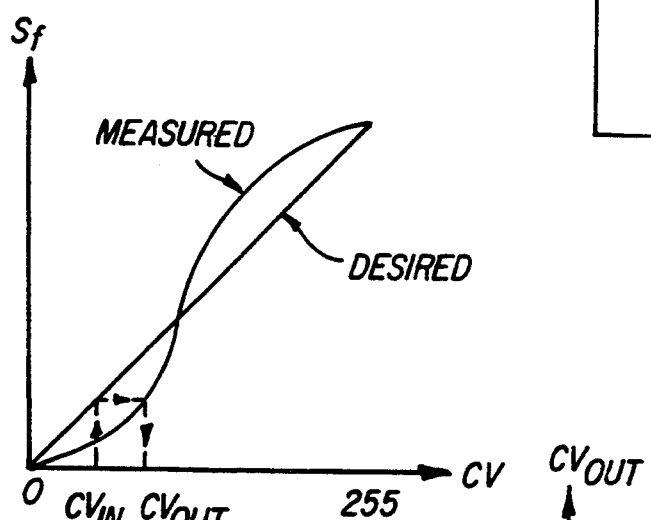
Figure 5:
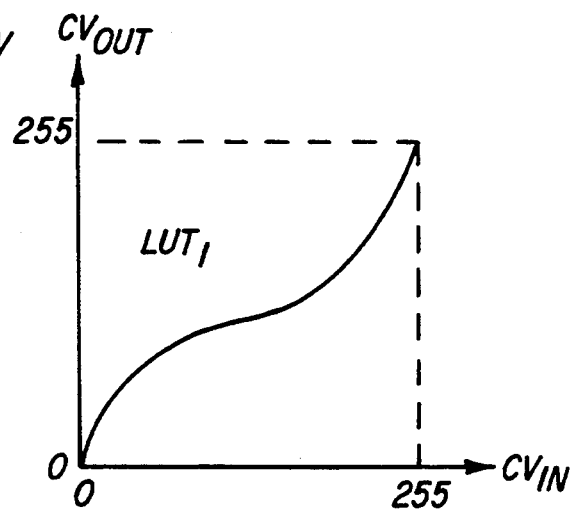
FIG. 5 is a graphical view of a representative LUT for a video printer.

Finally, (7) construct a look-up table (LUT) from the measured and desired tone curves (FIG. 4). The resulting LUT$_1$ is shown in FIG. 5. All calculations are carried out by the computer 20.

Similarly, the video monitor 22 is calibrated as follows.

(1) Vary the brightness and contrast controls of the monitor 22 to obtain the desired minimum luminance ($L_{min}$) and maximum luminance ($L_{max}$) which correspond to code values CV=0 and CV=255, respectively. Luminance from the monitor 22 is measured by a photometer 24.

Figure 6:
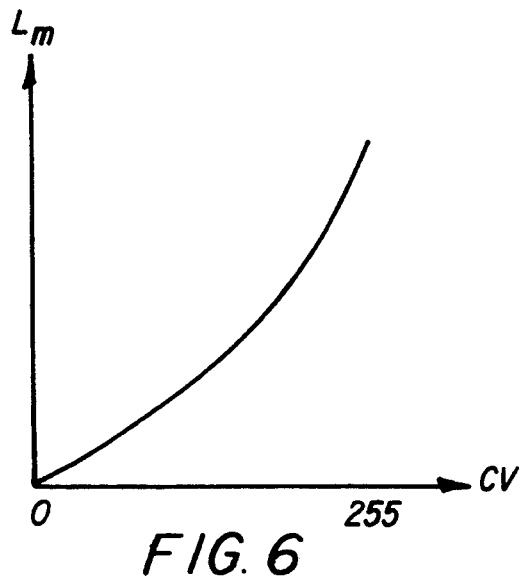
FIGS. 6–8 are graphical views useful in describing the calibration technique of the present invention in determining a LUT for a video monitor.

(2) Measure monitor 12 luminance for each level of the same gray scale test pattern (CV=0 to 255 with increment of 17). Calculate monitor 22 luminance for other code values using cubic spline or other interpolation techniques (FIG. 6).

Figure 7:
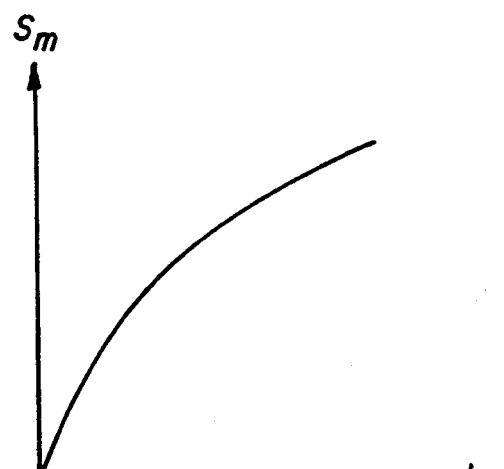

(3) Convert monitor 22 luminance ($L_m$) into perceived lightness ($S_m$) by using the visual perception characteristics (FIG. 7), $$S_m = c_1(L_m)^p + c_2 \qquad (2)$$

where $c_1$ and $c_2$ are normalization constants and p is close to $\frac{1}{3}$.

Figure 8:
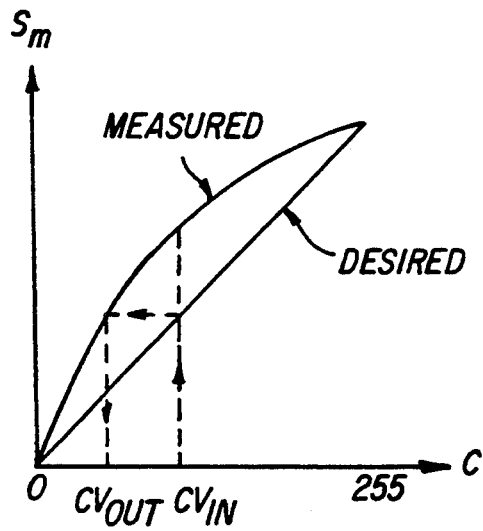
Figure 9:
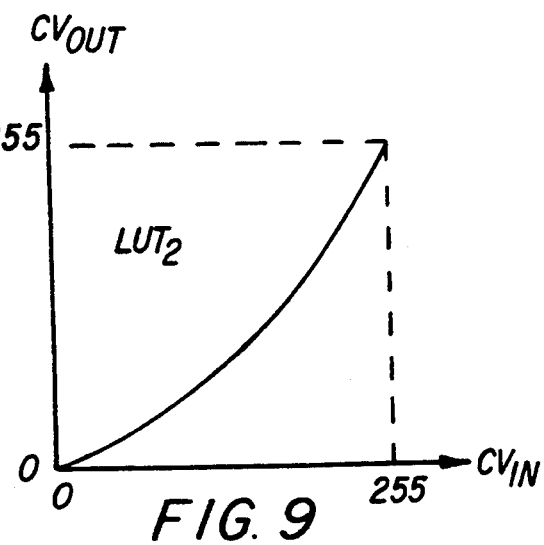
FIG. 9 is a graphical view of a representative LUT for a video monitor.

Finally, (4) construct a LUT from the measured and desired tone curves (FIG. 8). The resulting LUT$_2$ is shown in FIG. 9.

Referring now to FIG. 10, there will be described the use of LUT$_1$ and LUT$_2$ in the reproduction of a digital image on film that has the same gray scales as displayed on a video monitor, both of which are matched to human visual perception characteristics. When a digital image from a digital image data source 26 is printed out, the image data are first corrected by LUT$_1$ 28 on a pixel-by-pixel basis, then converted into analog signals by a digital-to-analog converter (DAC) 30, and finally fed to the CRTMFC 10 to produce an exposed film 14. Film 14 is processed in processor 16 to produce hard copy film 14'. The resulting image on film 14' will have a tone scale with uniform quantization in perceived lightness (i.e., perceived lightness varies linearly with code value).

Similarly, when the same digital image is displayed on monitor 22, the image data from source 26 are first corrected by LUT$_2$ 32 on a pixel-by-pixel basis, then converted into analog signals by a DAC 34, and finally fed to the video monitor 22 to produce an image on the monitor screen. Like the film image, the resulting screen image will have a tone scale with uniform quantization in perceived lightness.

Although the film 14' has a higher dynamic range than the video monitor 22, the step size of the calibrated tone scale on film, $\Delta S_f$, can be made to closely match the corresponding monitor's step size, $\Delta S_m$, by adjusting the luminance of the view-box on which the film is viewed.

With the proposed calibration technique, the resulting gray scales on film and on monitor, which are well matched to the human perception characteristics, provide equal visualization for equal image value changes, and avoid the loss of information both at the low end and high end (in image value) of the image. Also, the invention is applicable to the reproduction of color images, in which a color CRT monitor is used to display the image and a color printer (e.g., an ink-jet printer or a thermal dye transfer printer) is used to print the image. The invention will provide an optimum luminance scale in reproducing the image on the color monitor and on the recording media.

Industrial Application

The present invention has application in digital image processing, such as in the reproduction on film of a medical diagnostic digital image viewed on a video monitor.

Although this invention has been described with reference to preferred embodiments thereof, it will be understood that variations and modifications can be effected within the spirit and scope of the invention as described above and as defined in the appended claims.

What is claimed is:

1. A video image reproduction system comprising:
   a video image printer;
   a video monitor;
   means for applying a video image to said video image printer to reproduce said video image in photosensitive medium and to said video monitor to display said video image on said monitor; and
   means for correction said applied video image on a pixel-by-pixel basis so that said video image displayed on said monitor and said image reproduced in said medium have a uniform quantization in perceived lightness, such that the perceived grey scale varies linearly with video image signal value; wherein said video image printer is a cathode ray tube multiformat camera; wherein said cathode ray tube multiformat camera (CRT MFC) includes brightness, contrast and density controls and wherein a first look-up table is generated as follows:

printing a set of gray scale test patterns on film by means of said CRT MFC at preselected contrast and density control settings $C_0$ and $D_0$ and at incremental brightness settings $B_1, B_2, B_n$;

measuring the density of film with a densitometer to determine the maximum film density, $D_{max}$, for each brightness setting;

from a plot of B vs. $D_{max}$, selecting a desired $D_{max}$ and finding the brightness control setting B' to give the desired $D_{max}$;

causing said CRT MFC to print on film the same said gray scale test pattern using brightness, contrast and density settings, respectively, of B', $C_0$ and $D_0$;

with a densitometer, measuring the film density for each gray level and calculating intermediate densities using an interpolation technique;

converting the set of density values into perceived lightness values using the formula $$S_f = c_1(10^{-D_f})^p + c_2$$

where $c_1$ and $c_2$ are normalization constants, $D_f$ is film density, and $p \approx \frac{1}{3}$;

constructing said first look-up table from the measured and desired tone curves;

wherein said monitor has brightness and contrast controls; and wherein a second look-up table is generated as follows:

varying said brightness and contrast controls of said monitor to obtain, using a photometer, a desired minimum luminance, $L_{min}$, and maximum luminance, $L_{max}$, which correspond to minimum digital image value, CV=0, and maximum digital image value, $CV=2^n-1$, respectively;

using a photometer, measuring the monitor luminance for each level of said gray scale test pattern used in constructing said first look-up table;

calculating said monitor luminance for other digital image values, CV, using an interpolation technique;

converting the monitor luminance values $L_m$ into perceived lightness values $S_m$, using the visual perception characteristic formula $$S_m = c_1(L_m)^p + c_2$$

where $c_1$ and $c_2$ are normalization constants and $p \approx \frac{1}{3}$; and constructing said second look-up table from the measured and desired tone curves.

2. A video image reproduction system comprising:
a source of a digital image;
a printer for printing said digital image on photosensitive media;
a video display for displaying said digital image;
a first look-up table (LUT) for correcting said digital image before it is printed by said printer;
a second LUT for correcting said digital image before it is displayed on said video display;
wherein said first LUT is generated as follows:
printing a set of grey scale test patterns on photosensitive media and measuring the density of the patterns to set the $D_{max}$ of the printer;
calculating said video display luminance for other digital image values, CV, using an interpolation technique;
converting the video display luminance values $L_m$ into perceived lightness values $S_m$, using the visual perception characteristic formula $$S_m = c_1(L_m)^p + c_2$$

where $c_1$ and $c_2$ are normalization constants and $p \approx \frac{1}{3}$; and constructing said second look-up table from the measured and desired tone curves.

3. The system of claim 2 wherein said source of a digital image is a source of a digital medical image.

4. The system of claim 3 wherein said source of a digital medical image is a computed radiography source of digital radiographic image.

5. The system of claim 3 wherein said source of a digital medical image is a medical imaging modality.

6. The system of claim 3 wherein said source of a digital medical image is a radiographic film digitized.

7. The system of claim 2 wherein said printer is a laser printer, and said photosensitive media printed on is photosensitive film.

* * * * *